(12) United States Patent
Thottupurathu

(10) Patent No.: US 8,088,445 B2
(45) Date of Patent: Jan. 3, 2012

(54) PROCESS TO INCREASE THE OLEOPHOBICITY OF PTFE, AND RESULTING OLEOPHOBIC ARTICLES

(75) Inventor: Gopakumar Thottupurathu, Overland Park, KS (US)

(73) Assignee: General Electric Company, Schenectady, NY (US)

( * ) Notice: Subject to any disclaimer, the term of this patent is extended or adjusted under 35 U.S.C. 154(b) by 1010 days.

(21) Appl. No.: 12/021,752

(22) Filed: Jan. 29, 2008

(65) Prior Publication Data

US 2009/0191397 A1     Jul. 30, 2009

(51) Int. Cl.
*B05D 3/02*  (2006.01)

(52) U.S. Cl. ............... 427/372.2; 427/384; 427/385.5; 427/393.5; 427/379

(58) Field of Classification Search .............. None
See application file for complete search history.

(56) References Cited

U.S. PATENT DOCUMENTS

| | | |
|---|---|---|
| 3,953,566 A | 4/1976 | Gore |
| 4,187,390 A | 2/1980 | Gore |
| 4,365,049 A | 12/1982 | Tsunoda et al. |
| 4,686,168 A | 8/1987 | Fujii et al. |
| 4,945,125 A | 7/1990 | Dillon et al. |
| 5,066,683 A | 11/1991 | Dillon et al. |
| 5,157,058 A | 10/1992 | Dilllon et al. |
| 5,362,553 A | 11/1994 | Dillon et al. |
| 5,462,586 A | 10/1995 | Sugiyama et al. |
| 5,554,414 A | 9/1996 | Moya et al. |
| 5,614,250 A * | 3/1997 | Diener et al. ............. 427/554 |
| 6,196,708 B1 | 3/2001 | Rogers |
| 6,228,477 B1 | 5/2001 | Klare et al. |
| 6,676,993 B2 | 1/2004 | Klare |
| 7,534,471 B2 | 5/2009 | Klare et al. |
| 2001/0018096 A1* | 8/2001 | Klare ...................... 427/385.5 |
| 2006/0014010 A1 | 1/2006 | DeYoung et al. |
| 2007/0272606 A1 | 11/2007 | Freese et al. |

FOREIGN PATENT DOCUMENTS

| WO | WO95/26881 | 10/1995 |
|---|---|---|
| WO | WO99/58335 | 11/1999 |

OTHER PUBLICATIONS

AATCC Test Method 118-2002, "Oil Repellency: Hydrocarbon Resistance Test", AATCC Technical Manual/2007, pp. 187-189.
Great Britain Search Report issued for Great Britain Patent Application No. GB0901047.1, dated Oct. 19, 2009.
Declaration of Martin G. Hatfield submitted in U.S. Appl. No. 12/040,199, dated Jul. 13, 2010.

\* cited by examiner

*Primary Examiner* — Erma Cameron
(74) *Attorney, Agent, or Firm* — Nixon & Vanderhye P.C.

(57) ABSTRACT

Method of making a oleophobic layer on a fluoropolymer (e.g., polytetrafluoroethylene (PTFE)). The oleophobic layer includes a fluoroalkyl acrylate copolymer. The fluoropolymer may be an expanded PTFE formed into a porous membrane. The oleophobicity may be sufficient to repel #8 oil (n-heptane) in accordance with AATCC Test Method 118. There are also coated articles including fluoropolymers and oleophobic layers made from fluoroalkyl acrylate copolymers.

12 Claims, 1 Drawing Sheet

PROCESS TO INCREASE THE OLEOPHOBICITY OF PTFE, AND RESULTING OLEOPHOBIC ARTICLES

Certain embodiments of the present invention relate to methods of coating a fluoropolymer (such as, for example, a PTFE membrane) with an oleophobic treatment composition comprising a fluoroalkyl acrylate copolymer that may impart superior oleophobic characteristics.

BACKGROUND OF THE INVENTION

Materials including polytetrafluoroethylene (PTFE) are well-known in the art. PTFE has various well-established uses, including, for example, applications requiring lubricity (e.g., bearings, bushings, etc.) and applications requiring a porous membrane. These membrane-related applications may include, for example, filtration, venting, and/or diffusion/barrier applications. Filtration may use discs or sheets. Venting may be particularly useful in automotive-related applications requiring venting, such as, for example, headlamps, electric motors (e.g., for a windshield wiper, etc.), brakes, combustion engines, etc. In addition, healthcare-related applications may also require venting, including, for example, catheters, suction-related apparatuses, instruments, etc. Other venting applications for porous membranes are also known.

It may be beneficial at least in some instances to improve the oleophobicity of PTFE, such that water, oil, and other contaminants may be more effectively repelled by the membrane. See, for example, U.S. Pat. Nos. 5,462,586; 5,554,414; and 6,196,708.

BRIEF DESCRIPTION OF THE INVENTION

In certain embodiments, there is a method of increasing the oleophobicity of a fluoropolymer. The method comprises the steps of: forming an aqueous oleophobic treatment composition by mixing a solvent, water, and a fluoroalkyl acrylate copolymer; casting the aqueous oleophobic treatment composition on the fluoropolymer; and drying and curing the aqueous oleophobic treatment composition.

In certain embodiments, there is a method of repelling liquid contaminants from a surface of a porous membrane comprising polytetrafluoroethylene. The method comprises the steps of: forming an aqueous oleophobic treatment composition by mixing a solvent, water, and a fluoroalkyl acrylate copolymer; casting the aqueous oleophobic treatment composition on the porous membrane by spraying the aqueous oleophobic treatment composition and removing excess liquid from the porous membrane; and drying and curing the aqueous oleophobic treatment composition; and applying a liquid to the porous membrane having the cured oleophobic treatment. The liquid comprises n-heptane, diesel, or gasoline, and the porous membrane exhibits oleophobicity to the liquid.

In certain embodiments, there is a coated article having a high oleophobicity comprising: a fluoropolymer comprising polytetrafluoroethylene; and a oleophobic layer directly on and contacting the fluoropolymer; wherein the oleophobic layer comprises a fluoroalkyl acrylate copolymer. The coated article repels n-heptane.

DETAILED DESCRIPTION OF THE INVENTION

Figure 1:
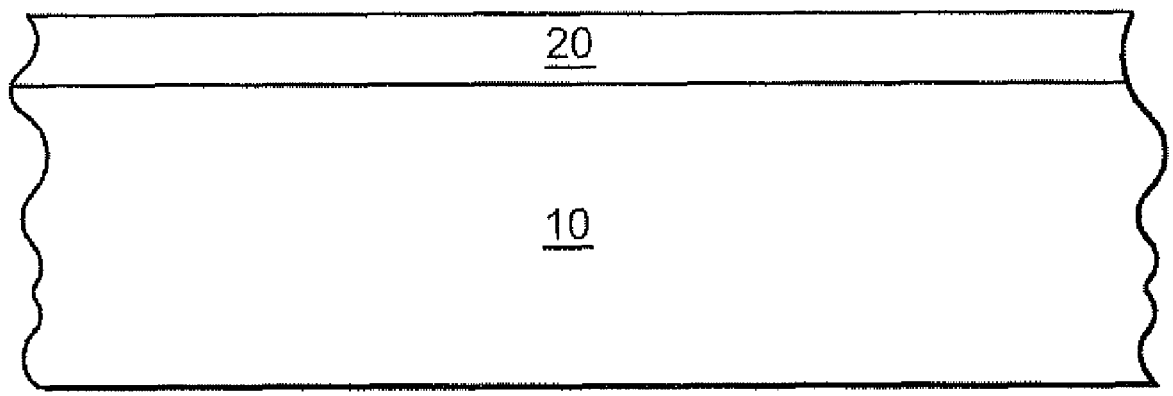
FIG. 1 is a cross-sectional view of a fluoropolymer substrate coated with a oleophobic surface treatment in accordance with an embodiment of the present invention.

In certain aspects, the present invention may relate to applying a surface treatment to a fluoropolymer, such as PTFE. Suitable fluoropolymers may include tetrafluoroethylene/(perfluoroalkyl) vinyl ether copolymer (PFA), tetrafluoroethylene/hexafluoropropylene copolymer (FEP), polytetrafluoroethylene (PTFE), etc. Depending on the particular application, the fluoropolymer may be used in an application requiring lubricity (e.g., a bearing, bushing, etc.) or in an application requiring a porous membrane. For example, certain aspects of the present invention relate to porous materials comprising PTFE, such as expanded PTFE (ePTFE).

In certain aspects, a porous materials—such as a membrane—may be a beneficial substrate whose surface may receive the oleophobic treatment. A suitable porous material may be a substantially homogenous fluoropolymer or may be laminated with a fluoropolymer. Laminated materials may be porous and gas permeable and may include natural or synthetic materials, such as, but not limited to, woven fabric, knitted fabric, non-woven fabric, netting, felt, etc., or porous sheets of synthetic polymers, cellulosic paper, or fiberglass paper, and the like. The materials can be used individually or in combination, such as in laminated composite articles, and may be in the form of sheet, tube, or plug. A variety of additives, such as ultraviolet radiation stabilizers, coloring agents, plasticizers, antistatic agents, antibacterial agents, and the like, can be present in the fluoropolymer as processing aids or to endow particular properties. In this respect, the term "fluoropolymer" includes impure and/or doped fluoropolymers. Selection of appropriate materials and forms will be made according to end use requirements such as (in the case of a porous membrane) filtration requirements, physical, chemical, and mechanical properties required, use environment, cost of materials and manufacturing, etc.

Porous polytetrafluoroethylene (and other fluoropolymer) sheets, rods, or tubing suitable for use in certain embodiments can be made by processes known in the art, for example, by stretching or drawing processes, by papermaking processes, by processes in which filler materials are incorporated with the PTFE resin and which are subsequently removed to leave a porous structure, or by powder sintering processes. In some embodiments, the porous polytetrafluoroethylene material is porous expanded polytetrafluoroethylene sheet, rods, or tubing having a structure of interconnected nodes and fibrils. The precise processing of the fluoropolymer and its precise structure and configuration may be, in certain embodiments, relatively unimportant and may vary widely.

In some embodiments, the fluoropolymer may be a microporous polymeric film that facilitates or permits the flow of a fluid (such as air and/or other gaseous materials) into or through the membrane. A possible polymeric film for use as the membrane includes expanded polytetrafluoroethylene (PTFE) films, such as those described, for example, in U.S. Pat. Nos. 3,953,566; 4,187,390; 4,945,125; 5,066,683; 5,157,058; and 5,362,553.

In some embodiments, there may be an unlaminated filter to be used as a substrate for the oleophobic treatment. Such a filter may be compatible with strong acids, aggressive solvents and high temperatures. These filters may have particular usefulness in applications requiring stringent temperatures or chemicals without adding particulates to the filtrate. A suitable membrane filters may have some hydrophobic properties and may have application in aerosol sampling, air venting, and gas filtration, for example, in environments containing water vapor.

In some embodiments, there may be a laminated filter to be used as a substrate for the oleophobic treatment. Such a filter may consists of a pure PTFE laminated to a polypropylene support, e.g., for improved durability and easy handling. These laminated filters may be chemically compatible with strong acids and most aggressive solvents such as alcohols.

Suitable fluoropolymer substrates include, for example, BHA-TEX® ePTFE membranes available from GE Energy. Possible substrates include, for example, QMO11 and QMO12 (which may be used for apparel-related applications) and QMO901 (which may be used for microventing-related applications), all of which are available from GE Energy.

In some embodiments, there is a process to improve the oleophobicity of ePTFE membrane. Known processes may not sufficiently repel at least some oils, such as fuels (e.g., gasoline, diesel, kerosene, heptane, etc.). In some embodiments, the oleophobic treatment improves the oleophobicity of a microporous ePTFE membrane by treating the membrane with an oleophobic finish involving fluoroalkyl acrylate copolymers. The oleophobic treatment may provide an air-permeable, moisture-vapor-transmissive, and wind-and-liquid-penetration-resistant composite membrane that resists absorbing oils (e.g., heptane, diesel and gasoline) and other contaminating agents. Such a oleophobic treatment on ePTFE membrane may also improve water and oil repellency, stain resistance, and/or soil releasability when compared to a comparable untreated ePTFE membrane.

The oleophobicity may be determined using the AATCC Test Method 118-2002 (which is technically equivalent to ISO 14419). Test Method 118-2002 is used to detect the presence of a surface having a low energy surface by evaluating the surface's resistance to wetting by a defined set of liquid hydrocarbons having varied surface tensions. The test liquids are identified in the following table:

TABLE 1

Oils Used in AATCC Test Method 118-2002

| AATCC Oil Repellency Grade Number | Composition |
| --- | --- |
| 0 | None (Fails Kaydol) |
| 1 | Kaydol (available from sources identified in the test method) |
| 2 | 65:35 Kaydol:n-hexadecane by volume |
| 3 | n-hexadecane |
| 4 | n-tetradecane |
| 5 | n-dodecane |
| 6 | n-decane |
| 7 | n-octane |
| 8 | n-heptane |

In the test method, drops of these standard test liquids are applied to the surface to be tested. The oil repellency grade number corresponds to the highest numbered test liquid that does not wet the surface. If the liquid does not wet the tested surface, a bead is observed. This bead—which manifests itself in a high contact angle between the edge of the test liquid and the tested surface—indicates the degree of oleophobicity of the tested surface.

In some embodiments, there may be a oleophobic membrane or laminate with repellency rating of 8 (i.e., n-heptane may be effectively repelled). Such a high repellency rating may have particular uses in various applications, including, for example, protective covers, protective apparel, air pollution control, vacuum media, etc. For instance, a filtration medium incorporated into a micro-vent may have a variety of applications requiring oil repellency, air permeability, and/or moisture vapor transmission rate (MVTR). Possible applications may include, for example: automotive headlamp vents; windshield wiper motor vents; medically related vents; etc. Of course, all possible uses of the treated fluoropolymer are contemplated in various embodiments of the present invention.

In some embodiments, the oleophobic treatment uses a composition including at least one repellant comprising a fluoroalkyl acrylate copolymer, such as, for example, those available under the Unidyne tradename from Daikin America, Inc. Such suitable fluoroalkyl acrylate copolymers may be described in U.S. Pat. Nos. 4,365,049 and 4,686,168.

The oleophobic treatment composition may also include at least one solvent and/or water. Possible alcohol-based solvents include, for example, isopropyl alcohol, methanol, ethanol, propanol, isobutanol, butanol, propylene glycol, ethylene glycol, etc. Non-alcohol solvents may also be possible in other embodiments. Other components—such as surfactants, wetting agents, rheological modifiers, etc.—may also be present in certain embodiments.

The following table (Table 2) summarizes possible oleophobic treatment compositions in accordance with certain embodiments of the present invention. The solvent and water may be exchangeable in certain embodiments; that is, certain embodiments comprise 0.1-10 wt % (and all subranges therebetween), 1-5 wt % (and all subranges therebetween), or 2-3 wt % (and all subranges therebetween) of the fluoroalkyl acrylate copolymer with the balance being any combination of water and solvent.

TABLE 2

Embodiments of the Treatment Composition

| Ingredient | Wt % | Wt % | Wt % |
| --- | --- | --- | --- |
| Solvent | 0-99.9 | 30-70 | 40-60 |
| Water | 0-99.9 | 20-80 | 30-70 |
| Fluoroalkyl Acrylate Copolymer | 0.1-10 | 1-5 | 2-3 |

The oleophobic treatment composition may be cast on—e.g., applied to—the substrate in any suitable manner, including, for example, spray-coating, spin-coating, roller-coating, dip-coating, and any other method of depositing or casting the uncured composition on the substrate. Furthermore, excessive liquid may be wiped from the substrate, though that is not performed in certain embodiments.

The drying may occur at a temperature sufficient to evaporate the solvent and/or water, such as, for example, between 100 and 350° C. for up to 10 minutes. They curing may also occur at any sufficient temperate to cure the fluoroalkyl acrylate copolymer (e.g., improve the physical stability of the coating by adhering the fluoroalkyl acrylate copolymer to the fluoropolymer substrate), such as, for example, at a temperature between 350 and 550° C. for up to 5 minutes. The drying and/or curing may occur for any suitable length of time, and shorter and longer times with higher and lower temperatures are contemplated within exemplary embodiments of the present invention.

Furthermore, a vacuum and/or hot air oven may be used to affect the temperature and time of the drying and/or curing. Indeed, in certain embodiments, it may be possible to dry and/or cure the oleophobic treatment composition without application of heat; this may reduce any heat-related effects on the structure and/or properties of the fluoropolymer substrate.

FIG. 1 illustrates a coated article in accordance with an embodiment of the present invention. Substrate 10 comprises a fluoropolymer, such as, for example, an ePTFE membrane.

On substrate 10 is a cured layer 20 comprising an oleophobic surface treatment comprising a fluoroalkyl acrylate copolymer. Layer 20 may be any suitable thickness sufficient to impart oleophobic properties, including thicknesses that may be as small as only a few micrometers.

Several, nonlimiting examples were prepared in accordance with exemplary embodiments of the present invention.

Example 1

50 wt % isopropyl alcohol, 40 wt % water, and 10 wt % Unidyne TG-581 (available from Daikin America, Inc.) were mixed using a lab mixer for 5 minutes at room temperature. The mixture was applied to a substrate via spray coating followed by wiping to remove excess liquid. The substrate was constrained by a metal hook during application of mixture. The substrate used was a yellow vent laminate (auto venting GE product code QVB657-ePTFE membrane laminated to 70 denier nylon woven taffeta pure finish, color yellow (Pantone #108)), then dried and cured in a lab oven. The drying occurred 250° F. for 5 min, and the curing occurred at 400° F. for 2 min.

The treated laminate was tested according to AATCC test method 118 for oil repellency. It was found that the treatment is very effective in repelling 100% IPA and Oil #8 (heptane). It was also found that the treated fabric repels engine oils, diesel and gasoline.

Example 2

50 wt % isopropyl alcohol, 30 wt % water, and 20 wt % Unidyne TG-470B (available from Daikin America, Inc.) were mixed using a lab mixer for 5 minutes at room temperature. Similar to Example 1, the mixture was applied to a substrate via spray coating followed by wiping to remove excess liquid. The coated substrate was dried and cured in a lab oven. The drying occurred 250° F. for 5 min, and the curing occurred at 400° F. for 2 min.

The treated laminate was tested according to AATCC test method 118 for oil repellency. It was found that the treatment is very effective in repelling Oil #8 (heptane).

The air permeability of the yellow vent laminate before the oleophobic treatment was 0.43 cubic feet per minute. After oleophobic treatment, the air permeability was 0.53 cubic feet per minute. It is believed that the increase in the air permeability is due to exposure to heat during drying/curing step of the treatment. Changes in the ePTFE membrane microstructure and porosity on heating are well known.

As described and claimed, all numbers and numerical ranges are approximate (regardless of whether immediately designated as such) and necessarily include at least some deviation.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of increasing the oleophobicity of a fluoropolymer, the method comprising the steps of:
   forming an aqueous oleophobic treatment composition by mixing a solvent, water, and a fluoroalkyl acrylate copolymer;
   casting the aqueous oleophobic treatment composition on the fluoropolymer; and
   drying and curing the aqueous oleophobic treatment composition such that the cured oleophobic treatment on the fluoropolymer can repel #8 oil according to AATCC test method 118 for oil repellancy.

2. The method of claim 1, wherein the fluoropolymer comprises a porous membrane comprising expanded polytetrafluoroethylene membrane.

3. The method of claim 1, wherein the solvent comprises at least one alcohol-based solvent chosen from the group consisting of isopropyl alcohol, methanol, ethanol, propanol, isobutanol, butanol, propylene glycol, and ethylene glycol.

4. The method of claim 1, wherein the aqueous oleophobic treatment composition comprises 0.1-10 wt % fluoroalkyl acrylate copolymer.

5. The method of claim 1, wherein the aqueous oleophobic treatment composition comprises 1-5 wt % fluoroalkyl acrylate copolymer.

6. The method of claim 1, wherein the aqueous oleophobic treatment composition comprises 2-3 wt % fluoroalkyl acrylate copolymer.

7. The method of claim 1, wherein the step of drying and curing comprises (i) exposure to a temperature sufficient to evaporate the solvent and/or water and (ii) exposure to a temperature to adhere the fluoroalkyl acrylate copolymer to the fluoropolymer.

8. The method of claim 1, wherein the step of drying and curing comprises (i) exposure to a temperature between 100 and 350° C. for up to 10 minutes and (ii) exposure to a temperature between 350 and 550° C. for up to 5 minutes.

9. A method of repelling liquid contaminants from a surface of a porous membrane comprising polytetrafluoroethylene, the method comprising the steps of:
   forming an aqueous oleophobic treatment composition by mixing a solvent, water, and a fluoroalkyl acrylate copolymer;
   casting the aqueous oleophobic treatment composition on the porous membrane by spraying the aqueous oleophobic treatment composition and removing excess liquid from the porous membrane; and
   drying and curing the aqueous oleophobic treatment composition; and
   applying a liquid contaminant to the porous membrane having the cured oleophobic treatment, wherein the liquid contaminant comprises n-heptane, motor oil, diesel, or gasoline, and wherein the porous membrane exhibits oleophobicity to the liquid contaminant such that the cured oleophobic treatment on the fluoropolymer can repel #8 oil according to AATCC test method 118 for oil repellancy.

10. The method of claim 9, wherein the aqueous oleophobic treatment composition comprises 0.1-10 wt % fluoroalkyl acrylate copolymer.

11. The method of claim 9, wherein the aqueous oleophobic treatment composition comprises 1-5 wt % fluoroalkyl acrylate copolymer.

12. The method of claim 9, wherein the aqueous oleophobic treatment composition comprises 2-3 wt % fluoroalkyl acrylate copolymer.

* * * * *